US010926481B2

(12) United States Patent
Knaupp et al.

(10) Patent No.: US 10,926,481 B2
(45) Date of Patent: Feb. 23, 2021

(54) METHOD AND DEVICE FOR CONNECTING FIBRE-REINFORCED WEBS

(71) Applicant: Covestro Deutschland AG, Leverkusen (DE)

(72) Inventors: Matthias Knaupp, Langenfeld (DE); Thomas Grimm, Cologne (DE); Henning Börger, Markt Erlbach (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 314 days.

(21) Appl. No.: 15/781,287

(22) PCT Filed: Dec. 14, 2016

(86) PCT No.: PCT/EP2016/080921
§ 371 (c)(1),
(2) Date: Jun. 4, 2018

(87) PCT Pub. No.: WO2017/102806
PCT Pub. Date: Jun. 22, 2017

(65) Prior Publication Data
US 2018/0354198 A1    Dec. 13, 2018

(30) Foreign Application Priority Data
Dec. 17, 2015    (EP) .................................... 15200659

(51) Int. Cl.
*B32B 37/00* (2006.01)
*B29C 65/08* (2006.01)
*B29C 65/00* (2006.01)

(52) U.S. Cl.
CPC ............ *B29C 65/087* (2013.01); *B29C 65/08* (2013.01); *B29C 66/1142* (2013.01);
(Continued)

(58) Field of Classification Search
USPC ........................................................ 156/73.1
See application file for complete search history.

(56) References Cited

U.S. PATENT DOCUMENTS 5,552,013 A * 9/1996 Ehlert ............... B29C 66/81433
156/555
5,817,199 A * 10/1998 Brennecke ........ B29C 66/81467
156/73.1
(Continued)

FOREIGN PATENT DOCUMENTS

JP      4-119808 A       4/1992
JP      H11333935        12/1999
WO      2014/088704 A2   6/2014

OTHER PUBLICATIONS

International Search Report for PCT/EP2016/080921 dated Mar. 31, 2017. (English translation attached).
(Continued)

*Primary Examiner* — James D Sells
(74) *Attorney, Agent, or Firm* — K&L Gates LLP

(57) ABSTRACT

Method and device for connecting two webs (1), reinforced with unidirectionally oriented continuous fibres, by ultrasonic welding, wherein the fibres are embedded in a matrix of polycarbonate and the webs have abutting edges that are substantially square and substantially flat, characterized by the following steps:—arranging the webs abutting one another in the region of the abutting edges in a welding device between a sonotrode (2) and an anvil (3),—welding the webs by means of ultrasound, wherein the sonotrode and the anvil exert pressure on the webs to be welded in the melting region between the webs and perpendicularly to the abutting edges of the webs,—removing the welded-together webs (4) from the welding device.

2 Claims, 4 Drawing Sheets

(52) U.S. Cl.
CPC .......... *B29C 66/435* (2013.01); *B29C 66/721* (2013.01); *B29C 66/7212* (2013.01); *B29C 66/72141* (2013.01); *B29C 66/73921* (2013.01); *B29C 66/81469* (2013.01); *B29C 66/836* (2013.01); *B29C 66/8362* (2013.01); *B29C 65/085* (2013.01); *B29C 65/086* (2013.01); *B29C 66/71* (2013.01); *B29C 66/8122* (2013.01); *B29C 66/81463* (2013.01); *B29C 66/81465* (2013.01)

(56) References Cited

U.S. PATENT DOCUMENTS

| | | |
|---|---|---|
| 9,821,511 B2 | 11/2017 | Fischer et al. |
| 2007/0158012 A1 | 7/2007 | Heil et al. |
| 2014/0286697 A1 | 9/2014 | Takeuchi et al. |

OTHER PUBLICATIONS

Written Opinion of the International Searching Authority for PCT/EP2016/080921 dated Mar. 31, 2017.

\* cited by examiner

METHOD AND DEVICE FOR CONNECTING FIBRE-REINFORCED WEBS

CROSS-REFERENCE TO RELATED APPLICATIONS

This application is a U.S. national stage application, filed under 35 U.S.C. § 371, of International Application No. PCT/EP2016/080921, which was filed on Dec. 14, 2016, and which claims priority to European Patent Application No. 15200659.9, which was filed on Dec. 17, 2015, the contents of each are incorporated by reference into this specification.

FIELD

The present invention relates to a process and an apparatus for joining fibre-reinforced sheeting articles by means of ultrasonic welding. The present invention also relates to a fibre-reinforced sheeting article suitable for joining to other congeneric sheeting articles by means of ultrasonic welding.

BACKGROUND

The use of fibre-reinforced materials has steadily increased in the last decades on account of their outstanding specific properties. Fibre-reinforced materials are employed in structures subject to acceleration in particular, in order to allow weight reduction and thus minimize energy consumption without incurring a loss of strength or stiffness of the material.

A fibre-reinforced material, also known as fibre composite or composite for short, is an at least biphasic material comprising a matrix in which fibres are substantially completely embedded and encased. The matrix has a shape-conferring function, is intended to protect the fibres from external influences and is necessary to transfer forces between the fibres and to introduce external loads. The fibres make a decisive contribution to the mechanical performance of the material, with glass, carbon, polymer, basalt or natural fibres often being employed in industry. Depending on the intended use, matrices employed are generally thermosetting or thermoplastic polymers, occasionally even elastomers.

Thermosetting polymers are already long established in a great many industries. However, a decisive disadvantage is the lengthy curing time which leads to correspondingly lengthy cycle times during processing to afford components. This makes thermoset-based composites unattractive especially for high-volume industry applications.

By contrast, thermoplastic-based composites, provided they are in the form of fully-consolidated semifinished products, e.g. as endless-fibre-reinforced sheets or profiles, are often merely heated, formed and cooled when subjected to further processing, which may nowadays be achieved in cycle times of well under one minute. The processing may also be combined with further process steps, for example insert-moulding with thermoplastics, which makes it possible to achieve a very high degree of automation and integration of functions.

The fibres are generally coated with a so-called size. If a thermoplastic is used as the matrix, suitable size systems for the size comprise a thermoplastic, a silane, an epoxy resin or a polyurethane. However it is also possible for the fibres, or a portion of the fibres, to comprise no size.

Often used reinforcing materials are semifinished textiles such as wovens, knits, multi-ply laids or nonwovens (e.g. batts, random-laid fibre mats etc.). It is a characteristic of these forms of fibre reinforcement that the orientation of the fibre—and thus the force paths in the subsequent component—is already determined in the semifinished textiles. This allows direct production of a multidirectionally reinforced composite.

In addition to these already established systems based on semifinished textiles, thermoplastic-based fibre-reinforced semifinished products in sheeting form are becoming increasingly important. These offer economy advantages since the process step of semifinished textile production may be eschewed. These thermoplastic-based fibre-reinforced semifinished sheetings are suitable for producing multi-ply constructions, particularly also for producing multidirectional constructions.

A process and an apparatus for producing a thermoplastic-based semifinished sheeting reinforced with unidirectionally aligned endless fibres are described in WO 2012 123 302 A1, the disclosure of which is hereby fully incorporated into the description of the present invention by reference. The disclosed process/the disclosed apparatus affords a fibre-reinforced semifinished sheeting where the endless fibres are aligned in a direction of 0° to the running direction of the supply sheeting.

A process and an apparatus for producing a thermoplastic-based semifinished sheeting reinforced with unidirectionally aligned endless fibres are also described in EP 2 631 049 A1, the disclosure of which is likewise hereby fully incorporated into the description of the present invention by reference.

The subject-matter of EP 2 631 049 A1 has the feature that a supply sheeting where the endless fibres are aligned in a direction of 0° to the running direction of the supply sheeting is used to produce a semifinished sheeting in which the fibres are unidirectionally aligned in a direction other than 0° to the running direction of the semifinished sheeting.

In the process disclosed in EP 2 631 049 A1, to produce the final semifinished sheeting, i.e. the sheeting where the fibres are unidirectionally aligned in a direction other than 0° to the running direction of the semifinished sheeting, segments are separated from a supply sheeting having a main direction, a plastic matrix and a multiplicity of fibres fixed in a unidirectionally oriented fashion which are at an angle of 0° to the running direction, these segments are arranged next to one another so that their longitudinal edges extending parallel to the running direction are parallel to one another and adjacent and are at the predetermined angle to the longitudinal direction, and adjacent segments are joined to one another in the region of their longitudinal edges.

The apparatus disclosed in EP 2 631 049 A1 comprises a dispensing means for dispensing segments of the supply sheeting having a main direction, a plastic matrix and a multiplicity of fibres fixed in a unidirectionally oriented fashion which are at an angle of 0° to the main direction, an aligning means for aligning the segments next to one another so that their longitudinal edges extending parallel to the main direction are parallel to one another and adjacent and are at a predefined angle (a) to the longitudinal direction, and a joining means for joining the adjacent segments in the region of their longitudinal edges.

A rate determining step in the production of the semifinished sheeting is the joining of the sheeting pieces cut from the supply sheeting, referred to in EP 2 631 049 A1 as segments, to afford the final semifinished sheeting.

In what follows, the supply sheeting, the sheeting pieces and the final semifinished sheeting are also referred to collectively as sheeting articles.

EP 2 631 049 A1 inter alia proposes performing this joining by means of adhesive-bonding or welding. EP 2 631 049 A1 inter alia proposes ultrasonic welding as a welding method.

Ultrasonic welding per se is known. It is a friction welding process where welding is achieved through a high-frequency mechanical vibration in the range of in general 20 to 35 kHz which results in heating between the components via molecular and interfacial friction.

A generator is used to generate high-frequency alternating current which is transmitted via a coaxial cable to an ultrasound transducer, the so-called converter, which uses the piezoelectric or magnetostrictive effect to generate a mechanical ultrasonic vibration therefrom. These vibrations are transmitted via an amplitude transformer to a sonotrode. Different applications require different designs of sonotrodes, normally produced from steel, aluminium or titanium, and the geometry thereof depends on the frequency provided by the generator employed and on the processing task.

Sonotrodes are tools set into resonance vibration by the introduction of high-frequency mechanical vibrations, i.e. ultrasound. They provide the connection from the ultrasound generator to the workpiece and adapt the ultrasonic vibration to the processing task. Sonotrodes are used in ultrasonic welding in order to produce a permanent joining of the components in the joining or contact zones through various processes. An anvil is used as an abutment for the sonotrode.

The sonotrode and the anvil are the only components of an ultrasonic welding machine in direct contact with the part to be welded. Their workfaces must therefore be shaped in such a way that the ultrasonic vibrations are optimally introduced into the joining zone and impressions on the parts to be welded are avoided. The mechanical vibrations are introduced vertically into the joining zones of the part to be welded.

When welding plastic the vibration is generally introduced perpendicularly to the joining partners. The plastic undergoes heating and starts to soften which causes the damping coefficient to increase. The increase in the damping coefficient results in higher internal friction which further accelerates the temperature increase. The molten materials join and after cooling and solidification are welded to one another.

In addition to spot welds, roller seam sonotrodes make it possible to produce seam welds, in particular in continuous fashion.

Ultrasonic welding is characterized by very short welding times and high economy. Identical and different materials may be joined to one another, the workpieces are heated to a small extent only in the weld region and the surrounding material is thus not damaged.

Machines for ultrasonic welding are developed and marketed by Nucleus GmbH, Dusseldorf for example. An example of such a machine is the ROTOSONIC V4E.

Ultrasonic welding of thermoplastic-based fibre-reinforced sheeting articles such as the segments referred to in EP 2 631 049 A1 is, however, very difficult in practice. This is apparent inter alia from the article "Advances in fusion bonding techniques for joining thermoplastic matrix composites: a review" (C. Ageorges, L. Ye, M. Hou, Composites: Part A 32 (2001) 839-857). This document highlights the problem that due to the fibre content there is less meltable material available which makes it more difficult to produce a cohesive join. This same article proposes the solution of superposing the sheeting articles to be joined and then subjecting them to ultrasonic welding under pressure.

DE 10 2008 059 142 A1 also discloses ultrasonic welding of thermoplastic-based fibre-reinforced sheeting articles. Here too, the sheeting articles are superposed and pressure is applied in order to be able to perform the welding.

However, this procedure has the disadvantage that the sheeting articles exhibit unevennesses and/or thickenings after welding, namely at the point where the sheeting articles overlapped. Such sheeting articles are no longer usable for applications which require an even surface.

A further disadvantage is the additional material usage required for the overlap. Producing the overlap also necessitates additional apparatus complexity which is an additional disadvantage.

The documents listed above do not disclose producing sheeting articles using the thermoplastic polycarbonate as the matrix material either.

Compared to the typically employed thermoplastic plastics, polycarbonates have the disadvantage that they have little propensity for creep and thus have a tendency for cracking when under constant stress. This is highly problematic particularly for use in composites comprising endless fibres because composites comprising endless fibres in their plastic matrix are under constant stress due to the endless fibres. Until now, polycarbonates have therefore in practice played only a subordinate role as a plastic matrix for such composites comprising endless fibres. It is, however, desirable in principle to widen the field of application of polycarbonates to also include unidirectionally fibre-reinforced sheeting articles because compared to the other customary thermoplastic plastics, such as polyamide or polypropylene, polycarbonates exhibit reduced volume shrinkage during solidification. Polycarbonates further exhibit a higher glass transition temperature Tg and a greater heat resistance compared to other thermoplastics.

Sheetings produced from unidirectionally fibre-reinforced sheeting articles comprising polycarbonate as the matrix material moreover make it possible to provide a multilayer composite having an aesthetically pleasing low-waviness surface coupled with good mechanical properties. Such a multilayer composite constructed from sheetings comprising polycarbonate as the matrix material exhibits metal-like haptics, optics and acoustics.

These properties also make such a multilayer composite suitable as a housing material for housings for electronic devices, in particular portable electronic devices such as laptops or smartphones and for exterior and interior trim of automobiles since such a multilayer composite can bear mechanical load as well as offering an exceptional outer appearance.

US2014286697A1 discloses a process for welding thermoplastic-based fibre-reinforced sheeting articles where the sheeting articles do not overlap. The thermoplastic here may be polycarbonate but the fibres are short fibres and are distributed in unoriented fashion. However, it is clearly apparent from FIG. 3 in US2014286697A1 that unevennesses and/or thickenings are present in the region of the weld.

SUMMARY

It is an object of the present invention to overcome the disadvantages of the prior art. It is a particular object of the present invention to provide a process and an apparatus with which sheeting articles reinforced with unidirectionally aligned endless fibres where the fibres are embedded in a matrix of polycarbonate may be cohesively joined to one another by means of ultrasonic welding without the sheeting articles overlapping one another. It is a further object of the present invention to provide a sheeting article reinforced with unidirectionally aligned endless fibres where the fibres are embedded in a matrix of polycarbonate which by means of ultrasonic welding can be cohesively joined to another congeneric sheeting article reinforced with unidirectionally aligned endless fibres where the fibres are embedded in a matrix of poly carbonate.

In this context, congeneric is to be understood as meaning that the sheeting article to be joined is congeneric in terms of both material and structure.

The sheeting articles shall exhibit no unevennesses or thickenings after welding.

The object is achieved by the subject-matter of the independent claims. Preferred embodiments are found in the dependent claims.

In the context of the present invention "cohesively joined" is to be understood as meaning that the join produced by ultrasonic welding, at any point on this join, exhibits values in respect of tensile strength and breaking elongation (both ascertained for example by tensile tests) which exhibit at least 50%, preferably 70%, particularly preferably 90%, of the tensile strength and breaking elongation as the sheeting article at any desired other point, the values for tensile strength and breaking elongation at the join produced by ultrasonic welding and at the any desired other point on the sheeting article being ascertained in identical fashion. Excluded from the any desired points both in the case of the join produced by ultrasonic welding and in the case of the other point on the sheeting article are regions which relative to the large areas of the sheeting article, i.e. the top and bottom sides of the sheeting article, lie within an edge region of 10 mm.

The object is in particular achieved by a process for joining two sheeting articles reinforced with unidirectionally aligned endless fibres by ultrasonic welding, wherein the fibres are embedded in a matrix of polycarbonate, characterized by the steps of:

(1) arranging the sheeting articles next to one another end-to-end in a welding apparatus,
(2) welding the sheeting articles by means of ultrasound,
(3) removing the sheeting articles that are welded to one another from the welding apparatus.

Preferred embodiments of the invention are depicted by the following figures without the invention being limited to these embodiments thereby.

DETAILED DESCRIPTION

Figure 1:
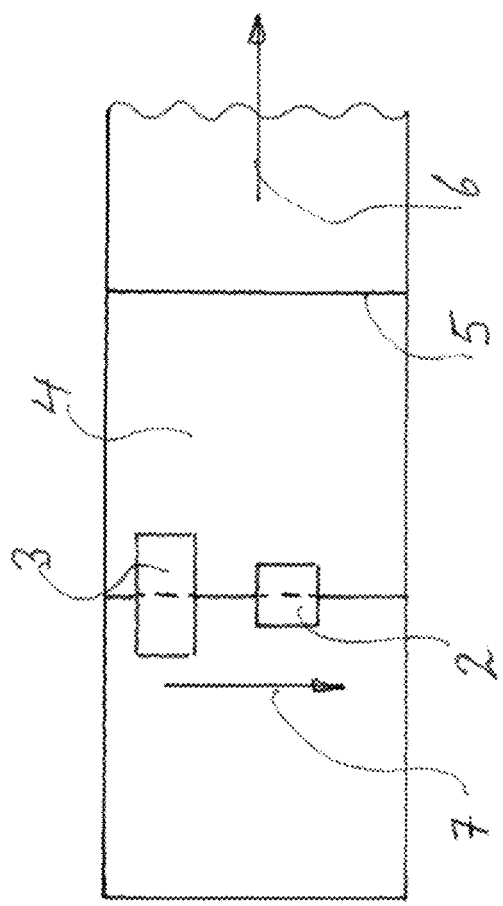
FIG. 1: shows a plan view of the apparatus for performing the process according to the invention for joining two fibre-reinforced sheeting articles by ultrasonic welding with only one sonotrode where the reference numerals have the following meanings:
1 sheeting section
2 roller seam sonotrode
3 press roll
4 final semifinished sheeting
5 weld join
6 advancement direction of sheeting article and of the final semifinished sheeting
7 operating direction of roller seam sonotrode and of press roll during ultrasonic welding procedure
Figure 1:
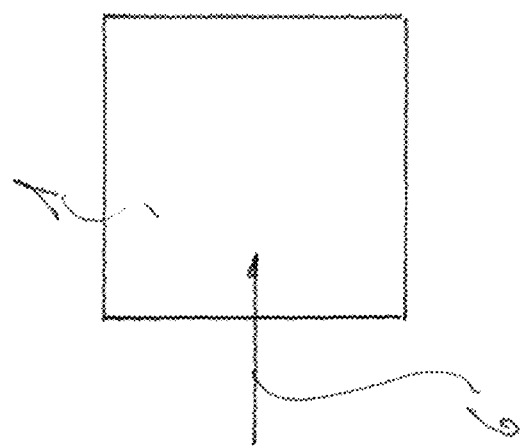
Figure 2:
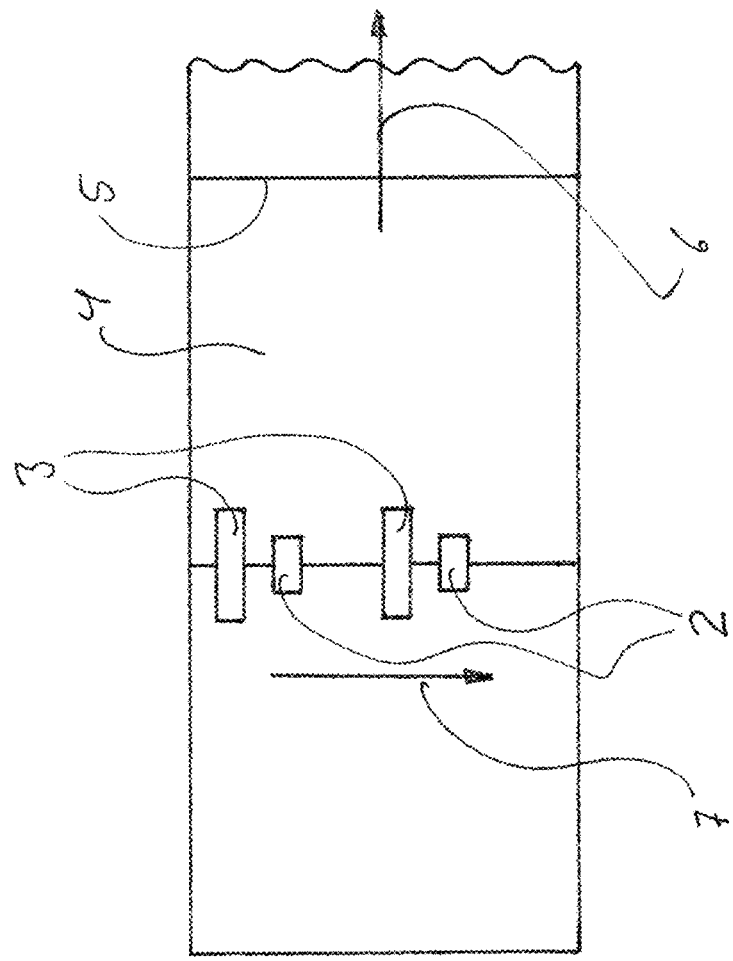
FIG. 2: shows a plan view of the apparatus for performing the process according to the invention for joining two fibre-reinforced sheeting articles by ultrasonic welding with two sonotrodes where the reference numerals have the following meanings:
1 sheeting section
2 roller seam sonotrodes
3 press rolls
4 final semifinished sheeting
5 weld join
6 advancement direction of sheeting article and of the final semifinished sheeting
7 operating direction of roller seam sonotrodes and of press roll during ultrasonic welding procedure
Figure 2:
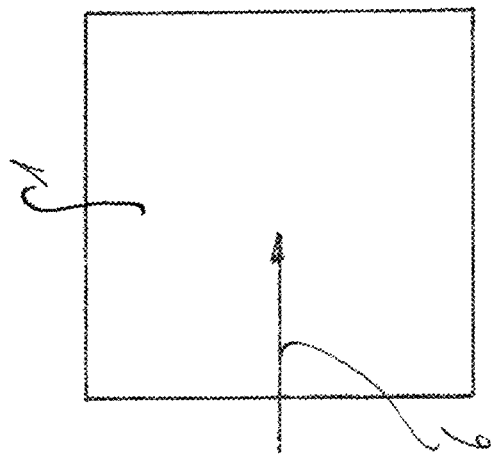
Figure 3:
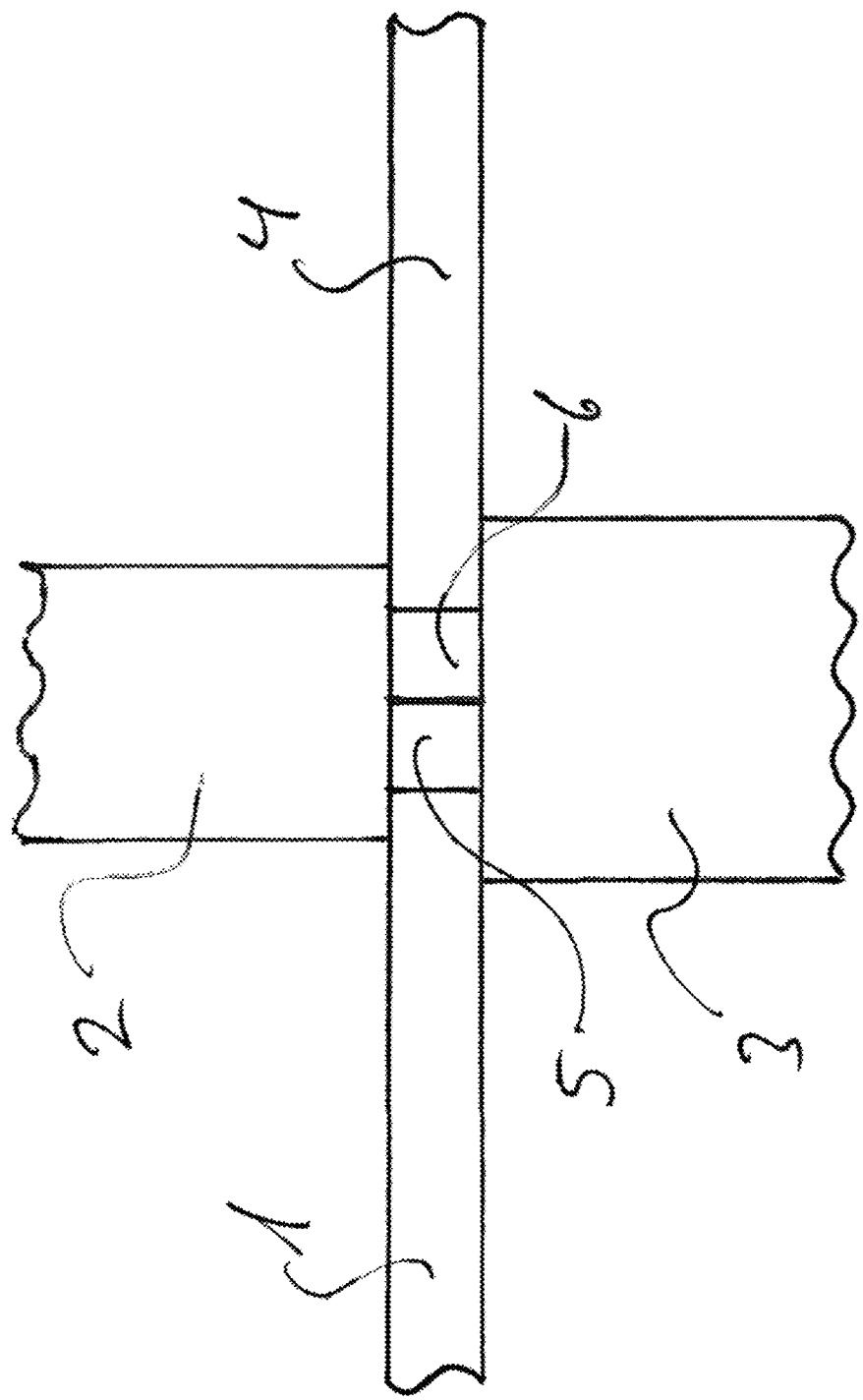
FIG. 3: shows a side view of the apparatus for performing the process according to the invention for joining two fibre-reinforced sheeting articles by ultrasonic welding where the reference numerals have the following meanings:
1 sheeting section
2 roller seam sonotrode
3 anvil roll
4 final semifinished sheeting
5 melting region of the sheeting section
6 melting region of the final semifinished sheeting
Figure 4:
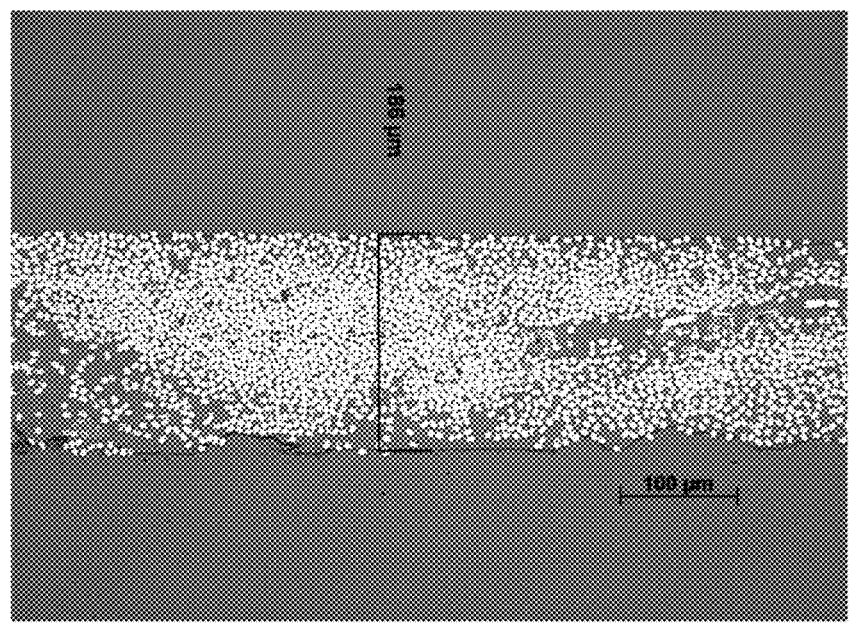
FIG. 4 shows a brightfield reflected light micrograph of a section through a fibre-reinforced semifinished sheeting in the region of the weld join, wherein the thickness was measured as 186 µm.
Figure 5:
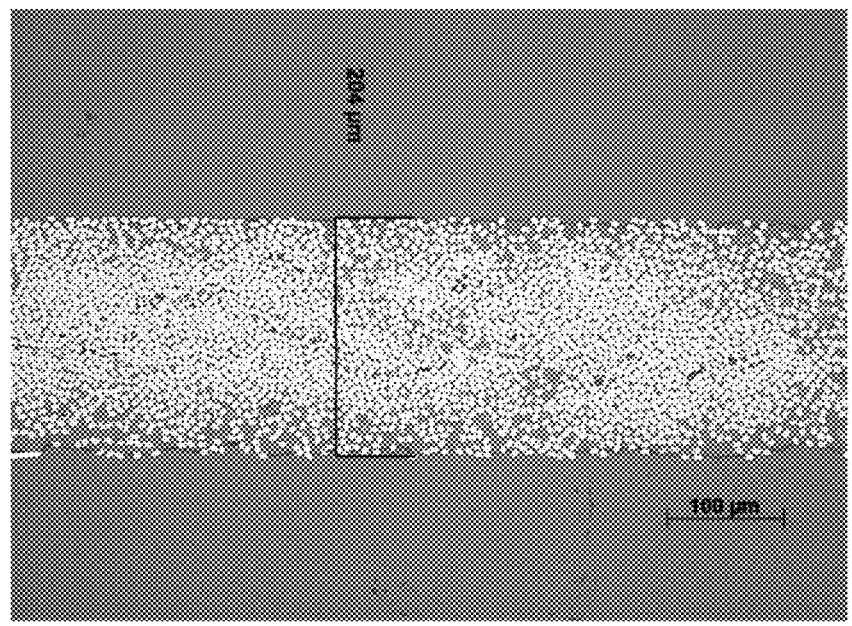
FIG. 5 shows a brightfield reflected light micrograph of a section through the same fibre-reinforced semifinished sheeting as in FIG. 5, but outside the region of the weld join, wherein the thickness of the semifinished sheeting was measured as 204 µm.

The term "end-to-end" in the context of the present invention is to be understood as meaning that the sheeting articles are each arranged next to one another with one of their narrow lateral faces such that these lateral faces are disposed parallel to one another and are in contact. It is preferable when the lateral faces of the sheeting articles are in contact substantially across their entire surface. In this context the term "substantially across their entire surface" is to be understood as meaning that based on at least one of the two lateral faces said face is covered to an extent of at least 90%, preferably at least 95%, particularly preferably at least 98%, very particularly preferably at least 99%, by the other lateral face. In the case where congeneric sheeting articles are concerned, as is generally the case, this then applies equally for both lateral faces. In the context of the present invention the term "end-to-end" excludes a case where the sheeting articles overlap one another.

These lateral faces are hereinafter also referred to as abutting ends.

To obtain a cohesive join without overlap of the sheeting articles it is advantageous for the sheeting articles to have abutting ends that are substantially rectangular and substantially even. This ensures that the sheeting articles exhibit no unevennesses or thickenings after welding.

In the context of the present invention "substantially rectangular" is to be understood as meaning that at least 90%, preferably at least 95%, particularly preferably at least 98%, of the abutting end area lies within a rectangle and at least 90%, preferably at least 95%, particularly preferably at least 98%, of this rectangle area is occupied by the abutting end area. The greatest linear dimension of the parts of the abutting end area that project out of the rectangle, i.e. of the convexities, is in each case not more than 10%, preferably not more than 5%, particularly preferably not more than 2%, of the height of the rectangle, wherein this dimension is in each case determined perpendicularly to the side of the rectangle from which the convexities protrude to the greatest degree. The greatest linear dimension of the concavities in the abutting end area which project into the rectangle is in each case not more than 10%, preferably not more than 5%, particularly preferably not more than 2%, of the height of the rectangle, wherein this concavity is in each case determined perpendicularly to the side of the rectangle into which the respective concavities project to the greatest degree. The rectangle is aligned at an angle of 85° to 95°, preferably of 88° to 92°, particularly preferably of 89° to 91°, very particularly preferably perpendicularly, to the largest area of the sheeting section/of the sheeting. The width to height ratio of the rectangle is preferably 50:1 or larger, particularly preferably 100:1 to 100 000:1, in particular 150:1 to 30 000:1.

The width of the rectangle is equal within the limits of the abovementioned variations to the side length of the sheeting article at this point and the height of the rectangle is equal within the limits of the abovementioned variations to the thickness of the sheeting article at this point.

The width is preferably from 60 to 2100 mm, preferably from 500 to 1000 mm, particularly preferably from 600 to 800 mm, and the thickness is preferably from 100 to 350 µm, preferably from 120 to 200 µm. However, the process according to the invention can also be used to process sheeting articles having other widths and thicknesses, in particular sheeting articles having thicknesses up to 1000 µm or more, for example up to 1200 µm or even up to 1500 µm or even up to 2000 µm can be processed; i.e. the process according to the invention can produce cohesive joins even for sheeting articles having these thicknesses.

The abutting end is thus one of the lateral faces of the sheeting article whose one spatial dimension is thickness and is under no circumstances one of the lateral faces of the sheeting article whose area is determined by the length and width of the sheeting article.

In the context of the present invention "substantially even" is to be understood as meaning that the maximum linear dimension of the concavities or convexities out of the plane of the rectangle perpendicularly into the/out of plane does not exceed at most 20 µm, preferably at most 15 µm, particularly preferably at most 10 µm %, very particularly preferably at most 5 µm of the height of the rectangle.

In the context of the present invention "that the sheeting articles exhibit no unevennesses or thickenings after welding" is to be understood as meaning that the thickness of the sheeting article at the weld join deviates from the thickness of the sheeting article outside the weld join by not more than 20%, preferably by not more than 15%, particularly preferably by not more than 10%, very particularly preferably by not more than 5%.

The supply sheeting from which the sheeting pieces are cut as disclosed for example in EP 2 631 049 A1 has a length of 100 to 3000 m and the same applies to the final semifinished sheeting. The sheeting pieces have a length of 60 to 2100 mm, preferably of 500 to 1000 mm. The same applies to the width and the length and the width of a sheeting article may be identical or different.

It is preferable when the large area of a sheeting article is in the shape of a parallelogram, in particular of a rectangle, very especially the shape of a square.

The supply sheeting and thus also the sheeting pieces and the final semifinished sheeting have a matrix which consists to an extent of at least 50 wt %, preferably at least 70 wt %, particularly preferably at least 90 wt %, very particularly preferably at least 95 wt %, in particular at least 97 wt %, of a polycarbonate-based thermoplastic.

When reference is made here to polycarbonate this also comprehends mixtures of different polycarbonates. Polycarbonate is furthermore used here as an umbrella term and thus comprehends both homopolycarbonates and copolycarbonates. The polycarbonates may further be linear or branched in known fashion.

It is preferable when the polycarbonate consists to an extent of 70 wt %, preferably 80 wt %, particularly preferably 90 wt % or substantially, in particular to an extent of 100 wt %, of a linear polycarbonate.

The polycarbonates may be produced in known fashion from diphenols, carbonic acid derivatives and optionally chain terminators and branching agents. Particulars pertaining to the production of polycarbonates have been well known to one skilled in the art for at least about 40 years. Reference may be made here for example to Schnell, Chemistry and Physics of Polycarbonates, Polymer Reviews, Volume 9, Interscience Publishers, New York, London, Sydney 1964, to D. Freitag, U. Grigo, P. R. Muller, H. Nouvertné, BAYER AG, Polycarbonates in Encyclopedia of Polymer Science and Engineering, Volume 11, Second Edition, 1988, pages 648-718, and finally to U. Grigo, K. Kirchner and P. R. Muller Polycarbonate in BeckerBraun, Kunststoff-Handbuch, Volume 31, Polycarbonate, Polyacetale, Polyester, Celluloseester, Carl Hanser Verlag Munich, Vienna 1992, pages 117-299.

Aromatic polycarbonates are produced for example by reaction of diphenols with carbonyl halides, preferably phosgene, and/or with aromatic dicarbonyl dihalides, preferably benzenedicarbonyl dihalides, by the interfacial process, optionally with use of chain terminators and optionally with use of trifunctional or more than trifunctional branching agents. Production via a melt polymerization process by reaction of diphenols with for example diphenyl carbonate is likewise possible. Diphenols suitable for producing polycarbonates are for example hydroquinone, resorcinol, dihydroxybiphenyls, bis(hydroxyphenyl)alkanes, bis(hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl)diisopropylbenzenes, phthalimidines derived from isatin derivatives or from phenolphthalein derivatives, and also the related ring-alkylated, ring-arylated and ring-halogenated compounds.

Preferably employed diphenols are those based on phthalimides, for example 2-aralkyl-3,3'-bis(4-hydroxyphenyl)phthalimides or 2-aryl-3,3'-bis(4-hydroxyphenyl)phthalimides such as 2-phenyl-3,3'-bis(4-hydroxyphenyl)phthalimide, 2-alkyl-3,3'-bis(4-hydroxyphenyl)phthalimides, such as 2-butyl-3,3'-bis(4-hydroxyphenyl)phthalimides, 2-propyl-3,3'-bis(4-hydroxyphenyl)phthalimides, 2-ethyl-3,3'-bis(4-hydroxyphenyl)phthalimides or 2-methyl-3,3'-bis(4-hydroxyphenyl)phthalimides and also diphenols based on isatins substituted at the nitrogen such as 3,3-bis(4-hydroxyphenyl)-1-phenyl-1H-indol-2-one or 2,2-bis(4-hydroxyphenyl)-1-phenyl-1H-indol-3-one.

Preferred diphenols are 4,4'-dihydroxydiphenyl, 2,2-bis(4-hydroxyphenyl)propane (bi-sphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4- hydroxyphenyl)sulphone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

These and other suitable diphenols are described for example in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2063 050, DE-A 2 036 052, DE-A 2 211 956 and DE-A 3 832 396, in FR-A 1 561 518, in the monograph H. Schnell, Chemistry and Physics of Polycarbonates, Interscience Publishers, New York 1964 and also in JP-A 620391986, JP-A 620401986 and JP-A 1055501986.

In the case of homopolycarbonates only one diphenol is employed and in the case of copolycarbonates two or more diphenols are employed.

Examples of suitable carbonic acid derivatives include phosgene or diphenyl carbonate. Suitable chain terminators that may be employed in the production of polycarbonates are monophenols. Suitable monophenols are for example phenol itself, alkylphenols such as cresols, p-tert-butylphenol, cumylphenol and mixtures thereof.

Preferred chain terminators are phenols which are mono- or polysubstituted with linear or branched, preferably unsubstituted C1 to C30 alkyl radicals or with tert-butyl. Particularly preferred chain terminators are phenol, cumylphenol and/or p-tert-butylphenol. The quantity of chain terminator to be used is preferably from 0.1 to 5 mol %, based on moles of diphenols respectively used. The addition of the chain terminators may be carried out before, during or after the reaction with a carbonic acid derivative.

Suitable branching agents are the trifunctional or more than trifunctional compounds familiar in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy -5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4-dihydroxytriphenyl)methyl)benzene and 3,3-bis(3-methyl-4-hydroxyphenyl)-2-oxo-2,3-dihydroindole.

The amount of the branching agents for optional employment is preferably from 0.05 mol % to 3.00 mol % based on moles of diphenols used in each case. The branching agents can either be initially charged with the diphenols and the chain terminators in the aqueous alkaline phase or added dissolved in an organic solvent before the phosgenation. In the case of the transesterification process the branching agents are employed together with the diphenols.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Furthermore, copolycarbonates may also be used. To produce these copolycarbonates 1 to 25 wt %, preferably 2.5 wt % to 25 wt %, particularly preferably 2.5 wt % to 10 wt %, based on the total amount of diphenols to be used, of polydiorganosiloxanes having hydroxyaryloxy end groups may be employed. These are known (U.S. Pat. No. 3,419,634, U.S. Pat. No. 3,189,662, EP 0 122 535, U.S. Pat. No. 5,227,449) and may be produced by methods known in the literature. Likewise suitable are polydiorganosiloxane-containing copolycarbonates; the production of polydiorganosiloxane-containing copolycarbonates is described in DE-A 3 334 782 for example.

The polycarbonates may be present alone or as a mixture of polycarbonates. It is also possible to employ the polycarbonate or the mixture of polycarbonates together with one or more plastics distinct from polycarbonate as blend partners.

Blend partners that may be employed include polyamides, polyesters, in particular polybutylene terephthalate and polyethylene terephthalate, polylactide, polyether, thermoplastic polyurethane, polyacetal, fluoropolymer, in particular polyvinylidene fluoride, polyethersulphones, polyolefin, in particular polyethylene and polypropylene, polyimide, polyacrylate, in particular poly(methyl)methacrylate, polyphenylene oxide, polyphenylene sulphide, polyetherketone, polyaryletherketone, styrene polymers, in particular polystyrene, styrene copolymers, in particular styrene acrylonitrile copolymer, acrylonitrile butadiene styrene block copolymers and polyvinyl chloride.

Up to 50.0 wt %, preferably 0.1 to 40 wt %, particularly preferably 0.2 to 30.0 wt %, based on the weight of the thermoplastic, of other customary additives may optionally also be present.

This group comprises flame retardants, anti-drip agents, thermal stabilizers, demoulding agents, antioxidants, UV absorbers, IR absorbers, antistats, optical brighteners, light-scattering agents, colourants such as pigments, including inorganic pigments, carbon black and/or dyes, and inorganic fillers in amounts customary for polycarbonate. These additives may be added individually or else in a mixture.

Such additives as are typically added in the case of polycarbonates are described, for example, in EP-A 0 839 623, WO-A 96/15102, EP-A 0 500 496 or "Plastics Additives Handbook", Hans Zweifel, 5th Edition 2000, Hanser Verlag, Munich.

It may generally be useful to add thermal stabilizers and flow improvers to the polycarbonate used for the matrix, provided that these do not reduce the molecular weight of the polycarbonate and/or reduce the Vicat temperature.

The fibres employed in accordance with the invention are in particular natural fibres or manmade fibres or a mixture of both. The natural fibres are preferably fibrous mineral or vegetable fibres and the man-made fibres are preferably inorganic synthetic fibres or organic synthetic fibres. Glass, carbon or polymer fibres are preferred in accordance with the invention, glass or carbon fibres being preferred in turn.

It is very particularly preferable to employ glass fibres or carbon fibres having an E-modulus of greater than 240 GPa, preferably greater than 245 GPa, particularly preferably of 250 GPa or more. Carbon fibres having these properties are preferred in particular. Such carbon fibres are commercially available from Mitsubishi Rayon CO., LtD. under the trade name Pyrofil.

The volume content of the fibres in the sheeting articles averaged over the volume of the respective sheeting article is from 20 to 80 vol %, preferably from 30 to 70 vol %, particularly preferably from 40 to 60 vol %, very particularly preferably from 45 to 55 vol %.

It is advantageous in accordance with the invention when the regions of the sheeting articles that are welded to one another, i.e. enter the weld join with one another, have a lower content of fibres than the remaining regions of the sheeting articles. It is preferable when the regions of the sheeting articles that are welded to one another have one half or less, particularly preferably one fifth or less, very particularly preferably one tenth or less, in particular one hundredth or less, of the fibre content of the remaining regions of the sheeting articles. These regions of the sheeting articles that are welded to one another are also referred to as melting regions. There is then enough meltable material available in these regions to produce a cohesive join.

This melting region is naturally at the surface of the sheeting article. The melting regions are preferably in the region of the abutting ends and preferably in turn extend over the entire abutting end.

It is preferable in accordance with the invention when a melting region is 0.1 mm to 3 mm, preferably 0.2 mm to 2 mm, particularly preferably 0.5 mm to 1 mm, deep measured perpendicularly to the abutting end inwards into the sheeting article.

A cohesive join can then be safely ensured also in the case of ultrasound welding without the to-be-welded sheeting articles needing to overlap. On the contrary, overlap of the to-be-welded sheeting articles is avoided.

It is also preferable in accordance with the invention when the sheeting articles are guided, preferably pressed, against each other with the abutting ends during welding so that the two opposite abutting ends are in immediate contact with one another and preferably exert pressure on one another. This guiding against one another, preferably pressing against one another, may be effected mechanically using apparatus, for example via a feeding device and/or a hold-down, or, in the simplest case, manually.

In one embodiment of the process according to the invention the sheeting articles arranged next to one another end-to-end are arranged between the sonotrode and the anvil and secured with a hold-down. The sonotrode and the anvil are guided between two linear axes arranged parallel to one another. The sonotrode and the anvil are guided as exactly as possible along the abutting ends that are in contact with one another, the width of the sonotrode covering at least the melting regions of both sheeting articles. It is preferable when the sonotrode is at least 10%, preferably at least 50%, particularly preferably at least 100%, wider than the sum of the width of the melting regions of both sheeting articles.

The process can achieve advancement rates of 1 to 30 m per minute, preferably 5 to 15 m per minute.

The invention also provides an apparatus for performing the process according to the invention for joining two fibre-reinforced sheeting articles by ultrasonic welding, wherein the apparatus comprises the following components:
  (A) a feeding device,
  (B) a sonotrode,
  (C) an anvil, It is advantageous in accordance with the invention when the sonotrode is a roller seam sonotrode, preferably a smooth, unprofiled sonotrode. This advantage may be enhanced when the accompanying anvil is an anvil wheel or an anvil roll. This allows even sheeting articles having long abutting ends to be welded at high advancement rates.

The sonotrode may alternatively exhibit a knurling at the curved surface, i.e the surface which contacts the semifinished sheeting. This knurling preferably extends over the entire curved surface of the sonotrode. This knurling preferably has a depth of 0.01 to 5 mm, particularly preferably of 0.1 to 2 mm. It is additionally preferable when the knurling is aligned at an angle of 30 to 150°, preferably 60 to 120°, particularly preferably of 75 to 105°, to the running direction of the semifinished sheeting. This knurling may for example be in the form of a left-to-right knurling.

The sonotrode and anvil are arranged as a pair in such a way that said pair exerts pressure on the to-be-welded sheeting articles, namely in the melting region between the to-be-welded sheeting articles and perpendicularly to the abutting ends of the sheeting articles. This ensures that the sheeting articles can be cohesively joined without the sheeting articles overlapping one another.

In one embodiment according to the invention the apparatus preferably also comprises between the feeding device and the sonotrode two linear axes for guiding the sheeting articles to be welded to one another. It is also preferable in accordance with the invention when the apparatus comprises a hold-down in front of the sonotrode alternatively or in addition to the two linear axes.

At high advancement rates such as the cited 1 to 30 m per minute, preferably 5 to 15 m per minute, it is advantageous when the apparatus according to the invention comprises a following press roll since the melting region after welding often does not cool quickly enough at high advancement rates and thus does not immediately provide the necessary strength for a durable cohesive join. The sheeting articles that have been welded to one another are locally fixed in their shape by the press roll thus giving them sufficient time for cooling and establishment of the required strength. This additionally ensures that the sheeting articles can be cohesively joined without the sheeting articles overlapping one another.

In order to be able to perform the welding along relatively long abutting ends quickly and efficiently it may additionally be advantageous for the apparatus to comprise two, three, four, five or more sonotrodes, wherein the sonotrodes may be arranged one after another along the joining zone in their rolling direction. The apparatus then comprises a number of anvil wheels equal to the number of sonotrodes and preferably also an equal number of following press rolls. Alternatively the anvil wheels may also be entirely or partially replaced by one or more anvil rolls.

When the apparatus comprises more than one sonotrode all sonotrodes may have a smooth surface or all sonotrodes may have a knurled surface or a portion of the sonotrodes has a smooth surface and another portion of the sonotrodes has a knurled surface.

The present invention further provides a fibre-reinforced sheeting article which has a matrix comprising one or more thermoplastics and which has at least one melting region, i.e. a region having a lower content of fibres than the remaining regions of the sheeting article, preferably one half or less, particularly preferably one fifth or less, very particularly preferably one tenth or less, in particular one hundredth or less, of the fibre content of the remaining regions of the sheeting article.

The fibres may be present in the matrix in the form of wovens, knits, multi-ply laids, nonwovens (e.g. batts, random-laid fibre mats etc.), uni- or multidirectionally aligned endless fibres or randomly distributed short fibres. The fibres are preferably present in the form of unidirectionally aligned endless fibres.

"Endless fibre" is to be understood as meaning that the length of the fibre is substantially equal to the dimension of the sheeting article to be reinforced in the direction of the fibres. "Unidirectionally" in connection with "fibre" is to be understood as meaning that the fibres in the sheeting article are aligned in only one direction.

The sheeting article may be a supply sheeting, a sheeting piece or a final semifinished sheeting, wherein this sheeting article has the features listed in the description hereinabove.

The sheeting article preferably comprises at least two melting regions. When the sheeting article has at least two melting regions then these are preferably aligned such that at least two thereof are parallel to one another. In this way simultaneous or successive welding of sheeting pieces with one another or welding of a sheeting piece with the end of a final semifinished sheeting makes it possible to produce and lengthen said semifinished sheeting.

However, the sheeting article may also comprise three, four, five, six or more melting zones. This also depends for example on the shape of the sheeting article. Thus a sheeting article in the shape of a parallelogram preferably has two or four melting regions, preferably in turn two. A sheeting article in the form of a hexagon may also have six melting regions; in the case of equilateral hexagons these may be used to produce from a plurality of by means of ultrasonic welding a sheeting article which provides gapless coverage of a relatively large area.

For example for a supply sheeting as per EP 2 631 049 A1 the melting regions would preferably be the two parallel outer sides. Sheeting pieces, referred to as segments in EP 2 631 049 A1, are then cut from this supply sheeting; these sheeting pieces then consequently also have two melting regions. Because the sheeting pieces are then further transported in a direction other than the original advancement direction without the sheeting pieces themselves undergoing a change in their original alignment, the melting regions of the sheeting pieces are now situated such that the melting regions of two sheeting pieces or of a sheeting piece and the end of the final semifinished sheeting are arranged in parallel and flushly opposite one another. The end of the final semifinished sheeting then has only one melting region which is arranged flushly opposite the melting region of a sheeting piece.

The present invention also provides for the use of sheeting articles according to the invention in the configuration of sheeting pieces for producing fibre-reinforced final sheetings by means of ultrasonic welding.

Such sheetings make it possible to produce a multilayer composite that exhibits an aesthetically pleasing low-waviness surface coupled with good mechanical properties. Such a multilayer composite constructed from sheeting articles comprising polycarbonate as the matrix material exhibits metal-like haptics, optics and acoustics and is thus also suitable as a housing material for housings for electronic devices, in particular portable electronic devices such as laptops or smartphones and for exterior and interior trim of automobiles since such a multilayer composite can bear mechanical load as well as offering an exceptional outer appearance. This multilayer composite may be produced from two, three, four, five, six or more sheeting articles.

The invention claimed is:

1. A sheeting article reinforced with unidirectionally aligned endless fibres which comprises a matrix of polycarbonate and which comprises at least one region as a melting region which has a lower content of fibres than the remaining regions of the sheeting article, wherein the content of fibres in the melting region is one half or less of the fibre content of the remaining regions of the sheeting article, wherein the melting regions are in the region of the abutting ends and are 0.1 mm to 3 mm deep measured perpendicularly to the abutting end inwards into the sheeting article.

2. A method comprising producing fibre-reinforced final sheetings by ultrasonic welding utilizing the sheeting article according to claim 1 in the configuration of a sheeting piece.

* * * * *